(12) United States Patent
Makino (10) Patent No.: US 6,848,669 B2
(45) Date of Patent: Feb. 1, 2005

(54) ELECTROMAGNETIC FLUID CONTROLLER

(75) Inventor: Tadaaki Makino, Nukata-gun (JP)

(73) Assignee: Denso Corporation, Kariya (JP)

( * ) Notice: Subject to any disclaimer, the term of this patent is extended or adjusted under 35 U.S.C. 154(b) by 142 days.

(21) Appl. No.: 10/224,371

(22) Filed: Aug. 21, 2002

(65) Prior Publication Data

US 2003/0042456 A1 Mar. 6, 2003

(30) Foreign Application Priority Data

Sep. 4, 2001 (JP) .......................................... 2001-267035
May 31, 2002 (JP) .......................................... 2002-159824

(51) Int. Cl.[7] .............................................. F16K 31/02
(52) U.S. Cl. ................................. 251/129.15; 251/129.16
(58) Field of Search ....................... 251/129.15, 129.16, 251/129.18

(56) References Cited

U.S. PATENT DOCUMENTS

| | | | |
|---|---|---|---|
| 3,004,195 A | | 10/1961 | Peras |
| 4,463,969 A | * | 8/1984 | Harrison ................ 280/5.514 |
| 4,502,031 A | | 2/1985 | Ito et al. |
| 6,105,931 A | * | 8/2000 | Frank et al. .......... 251/129.15 |
| 6,193,212 B1 | * | 2/2001 | Ohmi et al. .......... 251/129.16 |
| 6,547,215 B2 | * | 4/2003 | Matsusaka et al. .... 251/129.15 |
| 6,669,166 B2 | * | 12/2003 | Enomoto et al. ....... 251/129.15 |

FOREIGN PATENT DOCUMENTS

JP A-2000-274548 10/2000

OTHER PUBLICATIONS

Patent Abstracts of Japan, vol. 017, No. 608 (E–1457), Nov. 9, 1993, & JP 05 190321 A (Keihin Seiki MFG CO LTD ), 30 Juillet 1993.

* cited by examiner

Primary Examiner—Edward K. Look
Assistant Examiner—John K. Fristoe, Jr.
(74) Attorney, Agent, or Firm—Nixon & Vanderhye P.C.

(57) ABSTRACT

An electromagnetic fluid controller can prevent the action force of magnetic attraction between both abutting faces of an armature and a stator, and eliminate the necessity of a junction of the armature and a valve needle. Upon coil energization, the armature is attracted by an electromagnetic stator force, and the armature and the stator abut through a nonmagnetic material film. The nonmagnetic material film is formed of a material containing NiP on the end face of the stator with a thickness in a range from 30 to 100 micrometers. Thus, the action force of magnetic attraction between both the abutting faces upon deenergization of the coil can be prevented without providing an air gap, and delays in the timing of the separation of the armature from the stator can be decreased.

3 Claims, 5 Drawing Sheets

ELECTROMAGNETIC FLUID CONTROLLER

CROSS REFERENCE TO RELATED APPLICATION

This application is based upon, claims the benefit of priority of, and incorporates by reference the contents of prior Japanese Patent Applications No. 2001-267035 filed Sep. 4, 2001, and No. 2002-159824 filed May 31, 2002.

BACKGROUND OF THE INVENTION

1. Field of the Invention

The present invention relates to an electromagnetic fluid controller that controls the opening and closing of a fluid passage by using an electromagnetic drive.

2. Description of the Related Art

Figure 9:
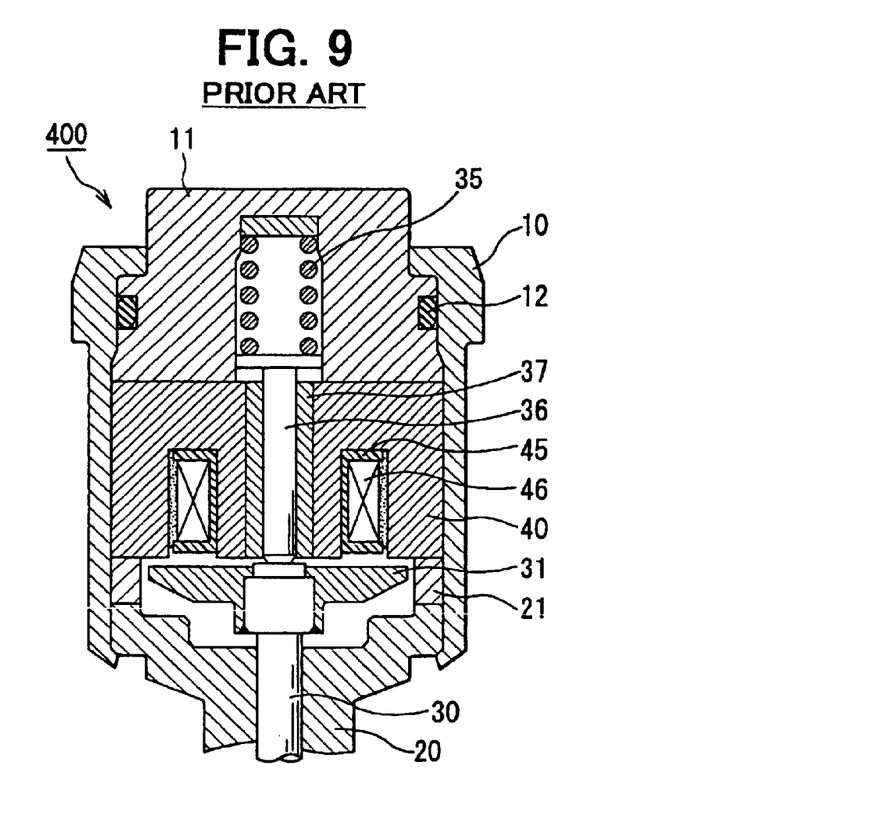
FIG. 9 is a cross-sectional view of the structure of a conventional electromagnetic fluid controller.

A conventional type of an electromagnetic fluid controller 400 is known and is shown in a cross-sectional view in FIG. 9. In this controller, upon energization of a coil 46, an armature 31 is attracted by an electromagnetic force generated at a stator 40, and then a valve needle 30 in one body with the armature 31 turns from being seated in a valve seat (not shown) formed at one end of a valve body 20 to being separated from the valve seat so that a fluid passage is opened.

Figure 10A:
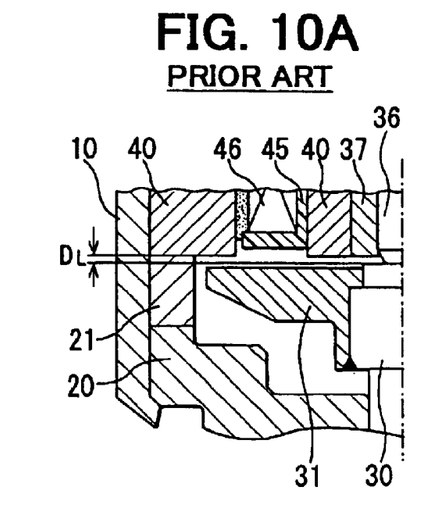
FIG. 10A is an enlarged partial cross-sectional view showing the motion in the conventional electromagnetic fluid controller of FIG. 9.
Figure 10B:
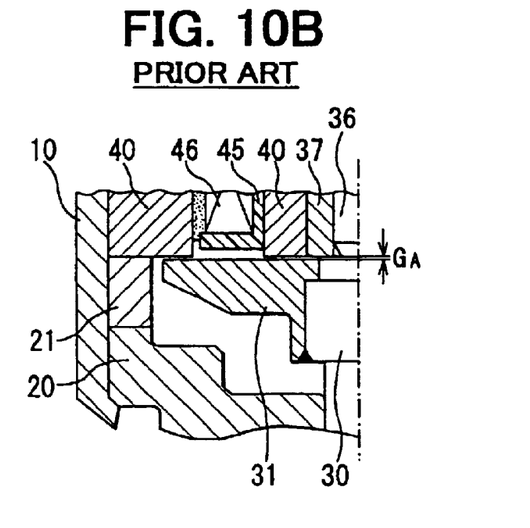
FIG. 10B is an enlarged partial cross-sectional view showing the motion in the conventional electromagnetic fluid controller of FIG. 9.

FIGS. 10A and 10B are enlarged partial cross-sectional views showing the motion of the armature 31 having the fixed valve needle 30 in FIG. 9, where FIG. 10A and FIG. 10B respectively show the state during deenergization and the state during energization.

As shown in FIG. 10B, an air gap (also referred to as a final air gap) GA is provided so that the armature 31 will not abut the stator 40 directly when it is attracted by the stator 40 upon energization of the coil 46. Air gap GA prevents an action force of magnetic attraction, which can be generated upon deenergization of the coil 46, between both the magnetic metallic material members of the armature 31 and the stator 40 in order to reduce the effect of a delay in the timing of the separation of the armature 31 from the stator 40.

In the above described controller, when the state changes from deenergization of the coil 46 shown in FIG. 10A to its energizaton shown in FIG. 10B, the armature 31 is attracted and moved to the side of the stator 40 with the lift amount DL. At the ending position of this motion, the top face of the valve needle 30 abuts the bottom face of a bearing 37, whereby the air gap GA is secured between the armature 31 and the stator 40. At this moment, an end face of the armature 31 faces to an end face of the stator 40, having an air gap GA without abutting it directly.

To provide a structure having the foregoing air gap GA, a difference in level, between the top face of the valve needle 30 abutting the bottom face of the bearing 37 and the top face of the armature 31 facing the stator 40, is to be applied in machining a specified dimension, which results in the disadvantage of higher manufacturing costs.

Furthermore, to be durable against shock loads applied by repeated motion, in addition to the press-fitting of the valve needle 30 and the armature 31 to each other, they are connected by laser welding, as indicated by the 'black colored triangle' mark in FIG. 9 and FIGS. 10A and 10B, or the like, which results in increased manufacturing costs.

SUMMARY OF THE INVENTION

The invention solves the above problems, and an objective of the present invention is to provide an electromagnetic fluid controller that prevents the action force of magnetic attraction between the armature and the stator without providing an air gap therebetween. Additionally, the electromagnetic fluid controller can be implemented if only the armature and the valve needle are fixed to each other by press fitting or the like.

In an electromagnetic fluid controller according to a first aspect of the invention, a valve needle opens and closes a fluid passage by being seated in and separated from a valve seat of a valve body. An armature is fixed to the valve needle on the side opposite to the valve seat. The armature faces a stator using a spring force of a spring positioned at a specified distance. Upon energization of a coil wound around a bobbin accommodated in the stator, the armature is attracted by the stator against the spring force of the spring, and the armature and the stator abut each other through a nonmagnetic material film formed on at least one of the abutting faces. Accordingly, the action force of magnetic attraction, which is caused by a residual magnetic flux generated between both the abutting faces of the armature and the stator upon deenergization of the coil, is restrained to thereby contribute to reducing the effect of the dispersion in delays in the timing of the separation of the armature from the stator.

In the electromagnetic fluid controller according to a second aspect of the invention, forming the nonmagnetic material film with a uniform thickness makes the distance between both the material surfaces of the armature and the stator uniform and in close proximity during the abutting of the armature. This creates the advantage of increasing the attraction force acting between the armature and the stator compared to the case when the distance between both the material surfaces is not uniform.

In the electromagnetic fluid controller according to a third aspect of the invention, forming the nonmagnetic material film on the entire face, on the side where the armature and the stator abut, makes it easier to form the film by plating etc., and reduces the abutting surface pressure to thereby bring the advantage of restraining the deterioration of the uniformity or maintenance of the thickness of the nonmagnetic material film.

In the electromagnetic fluid controller according to a fourth aspect of the invention, setting the total thickness of the nonmagnetic material film such that the action force of magnetic attraction, which is caused by the residual magnetic flux generated between the abutting faces upon deenergization of the coil, is equal to or lower than a specified value creates the advantage of preventing the action force of magnetic attraction caused by the residual magnetic flux generated between both the abutting faces of the armature and the stator upon deenergization of the coil.

In the electromagnetic fluid controller according to a fifth aspect of the invention, setting the total thickness of the nonmagnetic material film in a range from 30 to 100 micrometers creates the advantage of preventing the action force of magnetic attraction caused by the residual magnetic flux generated between both the abutting faces of the armature and the stator upon deenergization of the coil.

In the electromagnetic fluid controller according to a sixth aspect of the invention, forming the nonmagnetic material film of a material containing NiP makes the action force of magnetic attraction, which is caused by the residual magnetic flux generated between both the abutting faces of the armature and the stator upon deenergization of the coil, equal to or lower than a specified value. This creates the advantage of causing neither surface roughening nor peeling of the nonmagnetic material film despite repeated shock loads applied by the armature.

Further areas of applicability of the present invention will become apparent from the detailed description provided hereinafter. It should be understood that the detailed description and specific embodiments, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Hereinafter, the present invention will be described by way of embodiments. The embodiments are merely exemplary in nature and are in no way intended to limit the invention, its application, or uses.

First Embodiment

Figure 1:
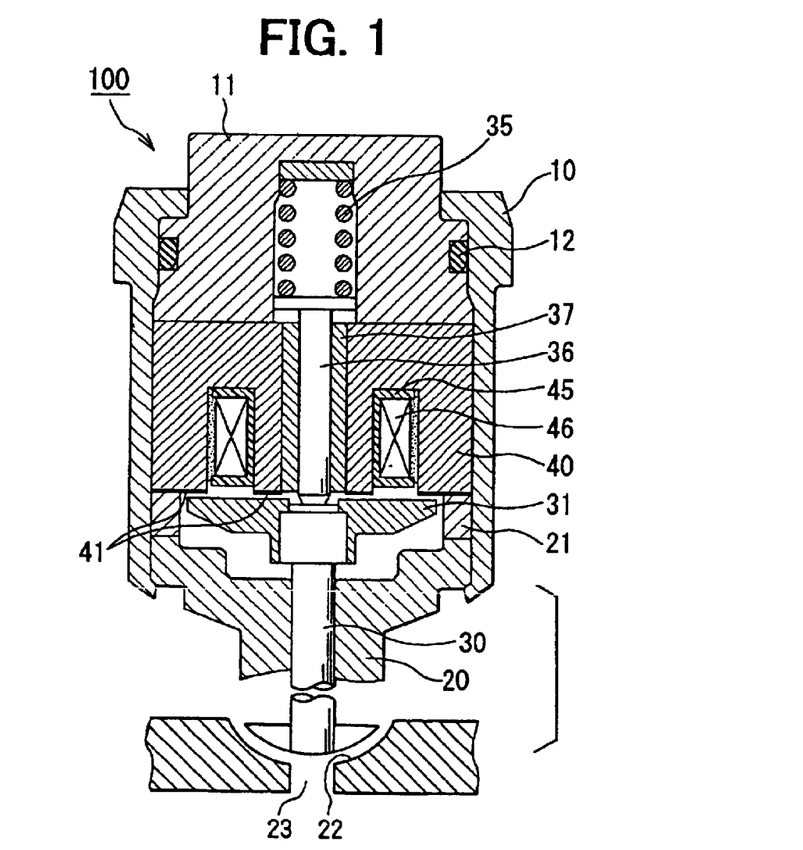
FIG. 1 is a cross-sectional view showing a main structural part of an electronic fluid controller in a first embodiment according to one embodiment of the invention.

FIG. 1 is a cross-sectional view showing the main structural part of an electromagnetic fluid controller in a first embodiment of the present invention. In the drawings, similar structures or corresponding parts to those of the aforesaid conventional device are identified by like reference numerals and marks.

In FIG. 1, at one end of a valve body 20 of an electromagnetic fluid controller 100, a valve seat 22 having a fluid passage 23 is formed. A reciprocative valve needle 30 is inserted through the valve body 20 in a direction of the central axis thereof. As the valve needle 30 is seated in and separated from the valve seat 22 of the valve body 20, the fluid passage 23 is alternately closed and opened. An armature 31 is fixed by press-fitting it to the valve needle 30 on the side opposite the valve seat 22.

A stator 40 is arranged facing the armature 31 at a specified distance. In the entire area of the bottom face of the stator 40, a non-magnetic material film 41 is formed with a specified uniform thickness. This nonmagnetic material film 41 is formed of, for example, a material containing a nonmagnetic material, NiP, by plating etc. so as to have a uniform thickness in a range from 30 to 100 micrometers. In a doughnut-shaped trench formed in the stator 40 on the side of the armature 31, a bobbin 45, around which a coil 46 is wound, is accommodated and fixed by an adhesive or the like.

In the stator 40 and at the side opposite to the armature 31, a cap member 11, accommodating a spring 35 and exerting a spring force in the direction of the central axis, is disposed. The cap member 11, through an O-ring 12 that is fitted around the cap member 11, the stator 40 formed with the nonmagnetic material film 41, a cylindrical spacer 21, and the valve body 20 are accommodated in a casing 10 in this order. The front end of the casing 10 is fitted by swaging to the outer edge of the valve body 20. Herein, the spacer 21 is used for adjusting the lift amount DL that is the stroke of the valve needle 30 in its reciprocal motion and will be described later.

A bearing 37 is press-fitted in the stator 40 in the direction of the central axis to slidably support a rod 36 in the direction of the central axis. Accordingly, during deenergization of the coil 46 shown in FIG. 1, the valve needle 30 having the fixed armature 31 is seated in a valve seat of the valve body 20 by the spring force of the spring 35 through a rod 36 so that the fluid passage 23 is closed.

In this embodiment, both the faces of the armature 31 and the nonmagnetic material film 41 formed on the stator 40 receive shock loads upon the attraction of the valve needle 30 to the stator 40. The faces restrain the shock loads applied in the direction of press fitting of the valve needle 30 and the armature 31. Consequently, junction by conventional laser welding etc., after the press fitting of the valve needle 30 and the armature 31, is not needed.

Figure 2A:
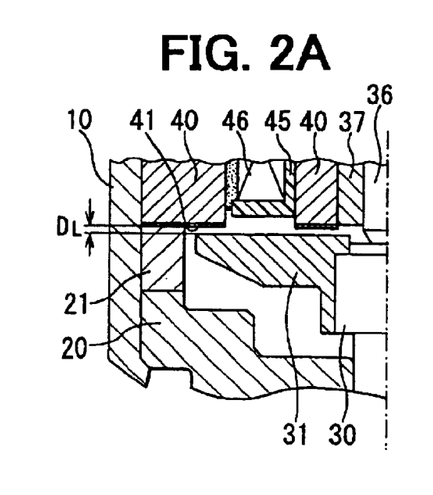
FIG. 2A is an enlarged partial cross-sectional view showing the motion in the electromagnetic fluid controller of FIG. 1.
Figure 2B:
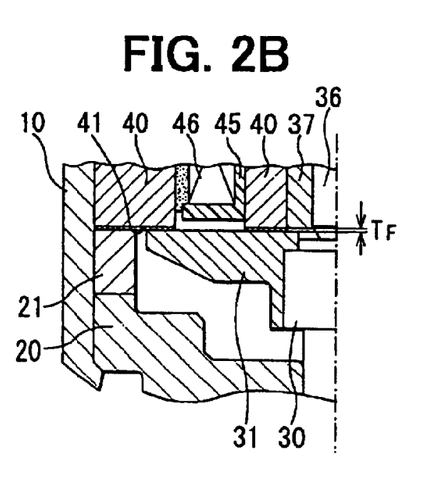
FIG. 2B is an enlarged partial cross-sectional view showing the motion in the electromagnetic fluid controller of FIG. 1.

Next, the motion will be described referring to FIGS. 2A and 2B, which are enlarged partial cross-sectional views showing the motion of the armature 31, shown in FIG. 1, having the fixed valve needle 30. FIG. 2A shows the state during deenergization of the coil 46, and FIG. 2B shows the state during energization of the coil 46.

During deenergization of the coil 46 shown in FIG. 2A, as in FIG. 1, the valve needle 30 is seated in the valve seat 22 of the valve body 20 by the spring force of the spring 35 through the rod 36. Herein, a specified lift amount DL is provided between the top face of the armature 31 fixed to the valve needle 30 and the nonmagnetic material film 41 formed on the bottom face of the stator 40 which faces the top face of the armature 31.

When the coil 46 shown in FIG. 2A is energized, the stator 40 is magnetized, whereby the armature 31 is attracted toward the stator 40 against the spring force of the spring 35 to abut the nonmagnetic material film 41 formed on the end face of the stator 40. The thickness TF of the nonmagnetic material film 41 corresponds to the gap dimension of the conventional air gap GA shown in FIG. 10B. Therefore, the armature 31 and the stator 40, which are both metallic members made of a magnetic material, do not directly abut each other due to the nonmagnetic material film 41, whereby the action force of magnetic attraction, which is between both the abutting faces and upon deenergization of the coil 46, is prevented to thereby decrease the dispersion in delays in the timing of the separation of the armature 31 from the stator 40.

As described above, the nonmagnetic material film 41 is formed with a uniform thickness TF in the entire area of the end face of the stator 40 where the armature 31 and the stator 40 abut each other. In this structure, on assembling, the thickness TF of the nonmagnetic material film 41 is added to the dimension of the stack of the stator 40, the spacer 21, and the valve body 20 in this order and in the direction of the axis. Accordingly, the thickness TF of the nonmagnetic material film 41 has no effect on the dimension setting of the lift amount DL generated by both the abutting faces of the armature 31 and the nonmagnetic material film 41 formed on the end face of the stator 40, upon deenergization of the coil 46.

Thus, the electromagnetic fluid controller 100 in this embodiment comprises the valve needle 30, the armature 31, and the stator 40. The valve needle 30 moves reciprocally in the valve body 20 to open and close the fluid passage by being seated in and separated from a valve seat 22 that is formed at one end of the valve body 20. The armature 31 is fixed to the valve needle 30 on the side opposite the valve seat 22. The stator 40 accommodates the bobbin 45 around which the coil 46 is wound, and is arranged such that the stator 40 faces the armature 31 by a spring force of the spring 35 at a specified distance during deenergization of the coil 46. In this constitution, the nonmagnetic material film 41 is formed on the abutting face of the stator 40 where the armature 31 and the stator 40 abut each other against the spring force of the spring 35 during energization of the coil 46.

This means that when the coil 46 is energized, the armature 31 is attracted by the stator 40 and abuts the nonmagnetic material film 41 formed on the end face of the stator 40. In other words, the armature 31 and the stator 40 abut each other through the nonmagnetic material film 41. This enables it to restrain the action force of magnetic attraction caused by a residual magnetic flux generated between both the abutting faces of the armature 31 and the stator 40 upon deenergization of the coil 46, thereby reducing the effect of the dispersion in delays in the timing of the separation of the armature 31 from the stator 40.

The nonmagnetic material film 41 of the electromagnetic fluid controller 100 in this embodiment is formed with uniform thickness. This makes the distance between both the material faces of the armature 31 and the stator 40 uniform and in close proximity during the abutting of the armature 31 and the stator 40 to thereby obtain the advantage of increasing the attraction force acting between the armature 31 and the stator 40.

The nonmagnetic material film 41 of the electromagnetic fluid controller 100 in this embodiment is formed in the entire area of the end face of the stator 40 on the side where the armature 31 and the stator 40 abut. This makes it easier to form the film by plating etc., and reduces the abutting surface pressure, thereby allowing it to resist deterioration in uniformity and maintain the desired thickness of the nonmagnetic material film 41.

Furthermore, the thickness of the nonmagnetic material film 41 of the electromagnetic fluid controller 100 in this embodiment is set such that an action force of magnetic attraction, which is caused by the residual magnetic flux generated between both the abutting faces upon deenergization of the coil 46, be equal to or lower than a specified value. Also, the thickness of the nonmagnetic material film 41 of the electromagnetic fluid controller 100 in this embodiment is set in the range from 30 to 100 micrometers. In this way, it was devised to make the action force of magnetic attraction, which is caused by the residual magnetic flux generated upon deenergization of the coil 46 between both the abutting faces, be equal to or lower than a specified value. In this regard, it was concluded, as stated later, with the experiment and research by the inventors that the preferred thickness of the nonmagnetic material film 41 then was in the range from 30 to 100 micrometers, whereby it is allowed to preferably prevent the action force of magnetic attraction caused by the residual magnetic flux generated between both the abutting faces of the armature 31 and the stator 40.

Figure 3:
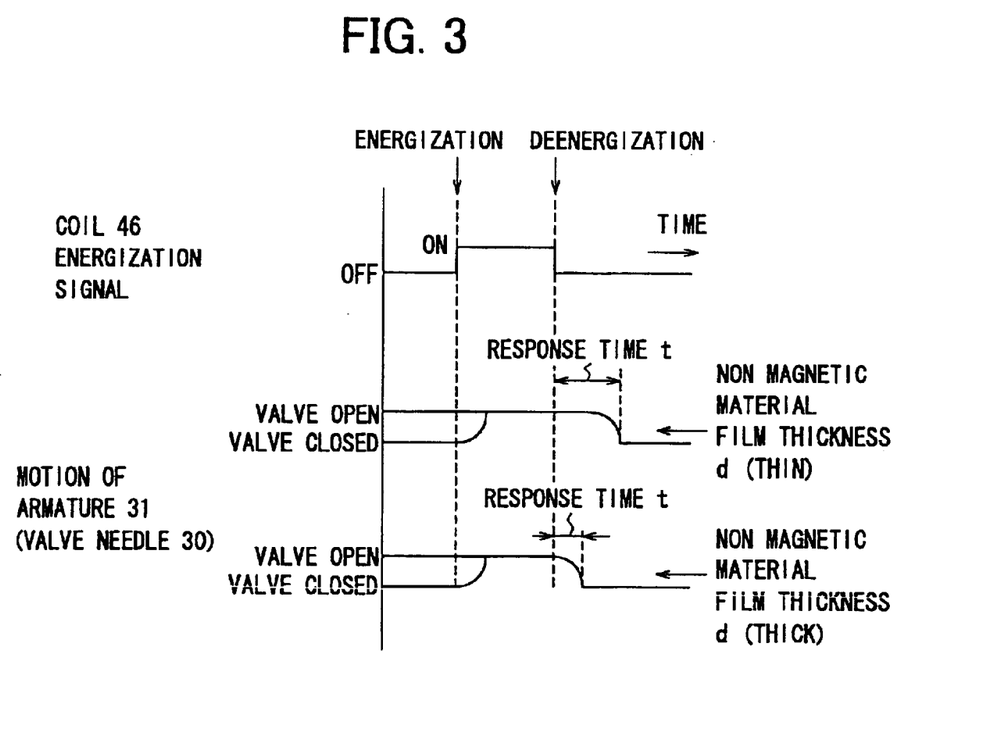
FIG. 3 is an explanatory diagram indicating the difference in response time upon deenergization with respect to the variation in the nonmagnetic material film thickness, in the motion of the electromagnetic fluid controller of FIG. 1.
Figure 4:
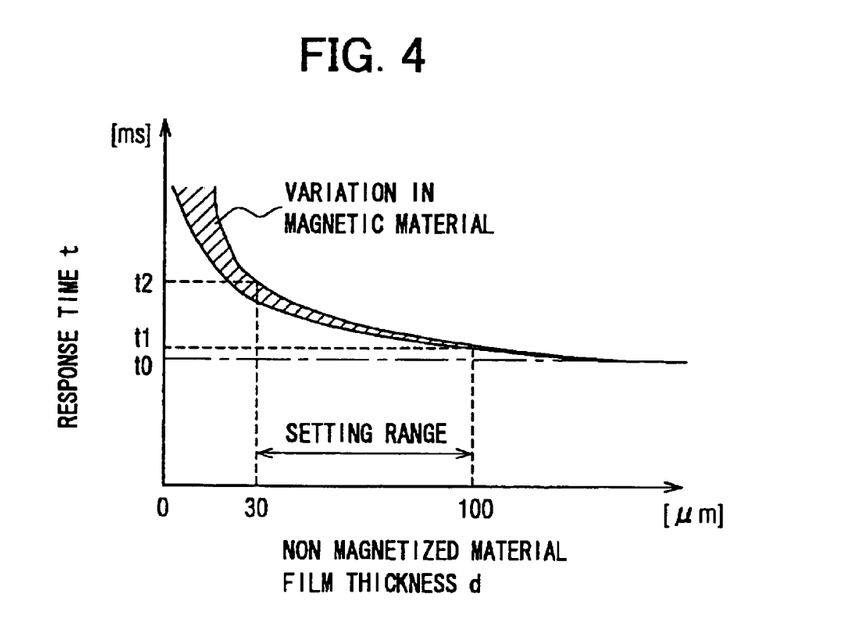
FIG. 4 is a characteristic diagram showing the relationship between the thickness of the nonmagnetic material film and the response time in the electromagnetic fluid controller of FIG. 1.

Here, referring to FIG. 3 and FIG. 4, the basis of the conclusion that the preferred thickness of the nonmagnetic material film ranges from 30 to 100 micrometers will be explained. FIG. 3 is an explanatory diagram indicating the difference in the response time t related to the difference in the thickness d of the nonmagnetic material film, wherein the response is upon deenergization and in the motion of the armature 31 having the fixed valve needle 30 of the electromagnetic fluid controller 100. FIG. 4 is a characteristic diagram showing the relationship between the thickness d (micrometers, $\mu$m) of the nonmagnetic material film and the response time t (milliseconds, ms) in the electromagnetic fluid controller 100.

FIG. 3 shows that the smaller the thickness d of the nonmagnetic material film is, the longer the response time t is, changing from the open state to the closed state of the valve by the motion of the armature 31. This occurs upon deenergization that switches the energization signal from ON to OFF as applied to the coil 46 of the electromagnetic fluid controller 100.

As shown in FIG. 4, the greater the thickness d of the nonmagnetic material film, the shorter the response time t becomes, gradually approaching t0. In other words, no matter how great the thickness d of the nonmagnetic material film, the response time t cannot be shorter than t0. As the thickness d of the nonmagnetic material film becomes smaller, the response time t exponentially and steeply becomes longer. If the thickness d is further made smaller, the effect of variations in magnetic material for the armature 31 and the stator 40 on the response time t becomes greater, as shown by the shaded area in FIG. 4. Herein, the response time t, corresponding to 100 micrometers as the thickness d of the nonmagnetic material film, was t1 ($\approx$1.03×t0), and the response time t, corresponding to 30 micrometers as the thickness d of the nonmagnetic material film, was t2 ($\approx$1.2×t0).

According to the aforesaid characteristic diagram, it is known that the response time t does not become shorter than a certain value that is defined by the valve mass, the lift amount, and the spring force, no matter how great the thickness d of the nonmagnetic material film is made. To the contrary, if the film is too thick, the distance between the facing magnetic pole surfaces (the action surfaces of magnetic attraction force) becomes greater, resulting in a weakened attraction force due to the amount of the generated attraction force. A weakened attraction force will cause an increase in the magnetic pole area, and further in the residual magnetic flux, consequently requiring a larger size electromagnetic fluid controller 100. Therefore, a conclusion was reached that setting the thickness d of the nonmagnetic material film in the range from 30 to 100 micrometers solves the practical problems in forming films, wherein the effect of the variation in magnetic material for the armature 31 and the stator 40 is small, and the response time t varies almost proportionally.

Additionally, the nonmagnetic material film 41 of the electromagnetic fluid controller 100 is formed of a material containing NiP. It is known, as a result of the experiments and research by the inventors, that materials containing NiP are preferable for the nonmagnetic material film 41 to prevent the action force of magnetic attraction between both the abutting faces upon deenergization of the coil 46. In other words, by forming the nonmagnetic material film 41 on the end face of the stator 40 facing the armature 31 by plating or the like, the action force of magnetic attraction caused by the residual magnetic flux generated between both the abutting faces of the armature 31 and the stator 40 could be made equal to or lower than a specified value. Additionally, the repeated shock loads by the armature 31 caused neither the surface roughening of the nonmagnetic material film 41 nor its peeling off the end face of the stator 40.

Second Embodiment

Figure 5:
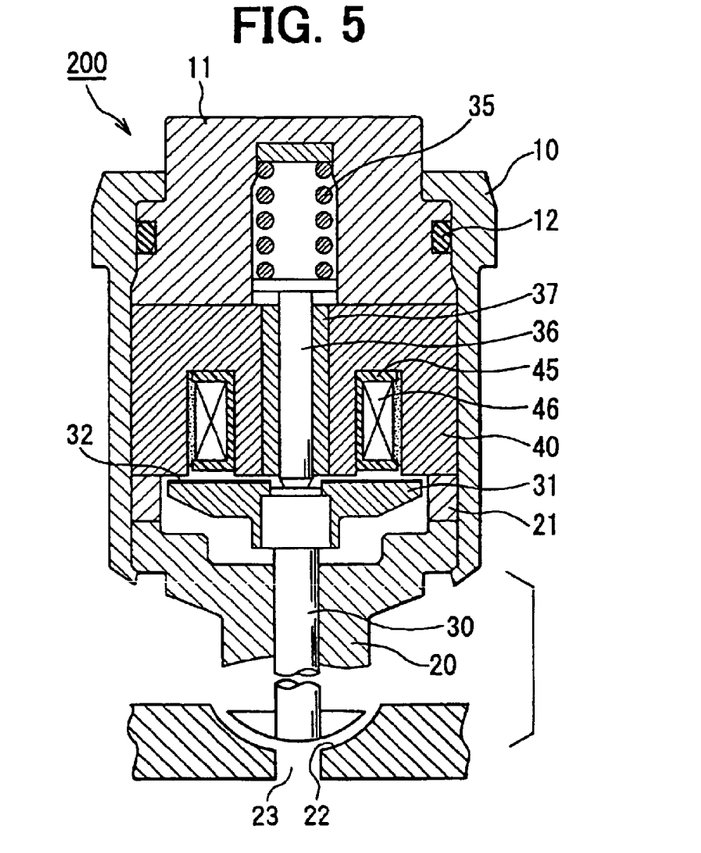
FIG. 5 is a cross-sectional view showing a main part structure of an electronic fluid controller in a second embodiment according to an embodiment of the invention.

FIG. 5 is a cross-sectional view showing the main part structure of an electromagnetic fluid controller in a second embodiment of the present invention. In FIG. 5, in the structure of an electromagnetic fluid controller 200, a nonmagnetic material film 32 is formed on the top face of an armature 31 instead of the nonmagnetic material film 41 formed on the bottom face of the stator 40 in the first embodiment. FIG. 5 also shows a valve seat 22 and a fluid passage 23. Other parts are not changed, and therefore, the details on those parts will not be described here. With regard to the thickness and the material of the nonmagnetic material film 32, the same descriptions as in the above-mentioned first embodiment can be applied.

Figure 6A:
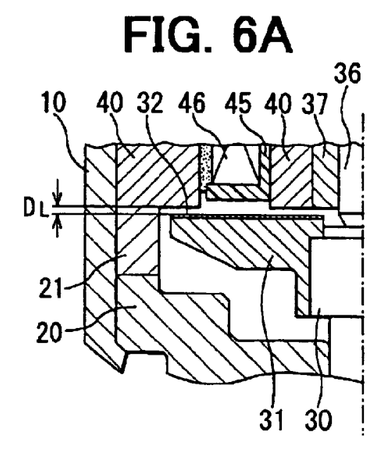
FIG. 6A is an enlarged partial cross-sectional view showing the motion in the electromagnetic fluid controller in FIG. 5.

Next, the motion will be described referring to FIGS. 6A and 6B, which are enlarged partial cross-sectional views showing the motion of the armature 31 shown, in FIG. 5, having a fixed valve needle 30. FIG. 6A shows the state during deenergization of a coil 46, and FIG. 6B shows the state during energization of the coil 46.

During deenergization of the coil 46 shown in FIG. 6A, as in FIG. 5, the valve needle 30 is seated in the valve seat 22, having a fluid passage 23, of a valve body 20 by the spring force of a spring 35 through a rod 36. Herein, a specified lift amount DL is provided between the nonmagnetic material film 32 formed on the top face of the armature 31 that is fixed to the valve needle 30 and the bottom face of the stator 40 facing the nonmagnetic material film 32.

Figure 6B:
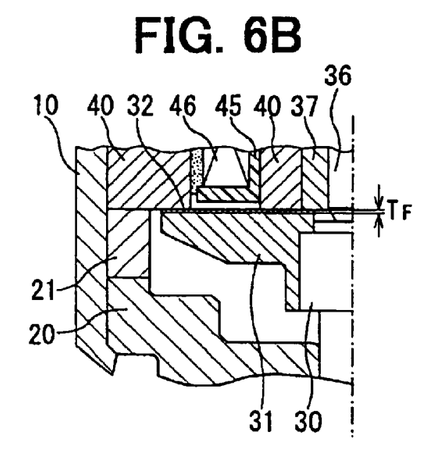
FIG. 6B is an enlarged partial cross-sectional view showing the motion in the electromagnetic fluid controller in FIG. 5.

When the coil 46 shown in FIG. 6B is energized, the stator 40 is magnetized, whereby the armature 31 is attracted to the side of the stator 40 against the spring force of the spring 35, so that the nonmagnetic material film 32 formed on the end face of the armature 31 abuts the stator 40. The thickness TF of the nonmagnetic material film 32 corresponds to the gap dimension of the conventional air gap GA shown in FIG. 10B. Therefore, the armature 31 and the stator 40, which are both metallic, magnetic members, do not directly abut each other due to the nonmagnetic material film 32. As a result, the action force of magnetic attraction, which is generated between both the abutting faces upon deenergization of the coil 46, is prevented to thereby decrease the dispersion in delays in the timing of the separation of the armature 31 from the stator 40.

Thus, the electromagnetic fluid controller 200 in the embodiment of FIG. 5 comprises the valve needle 30, the armature 31, and the stator 40. The valve needle 30 moves reciprocally in the valve body 20 to close and open a fluid passage by being seated in and separated from a valve seat 22 formed on one end of the valve body 20. The armature 31 is fixed to the valve needle 30 on the side opposite the valve seat 22. The stator 40 accommodates a bobbin 45 around which the coil 46 is wound, and is arranged such that the stator 40 faces the armature 31 by the spring force of the spring 35 at a specified distance during deenergization of the coil 46. In this constitution, the nonmagnetic material film 32 is formed on the abutting face of the armature 31 where the armature 31 and the stator 40 abut each other against the spring force of the spring 35 during energization of the coil 46.

This means that when the coil 46 is energized, the armature 31 is attracted by the stator 40, and the nonmagnetic material film 32 formed on the end face of the armature 31 abuts the stator 40. In other words, the armature 31 and the stator 40 abut each other through the nonmagnetic material film 32. This enables it to restrain the action force of magnetic attraction caused by a residual magnetic flux generated upon deenergization of the coil 46 between both the abutting faces of the armature 31 and the stator 40, thereby reducing the effect of the dispersion in delays in the timing of the separation of the armature 31 from the stator 40.

The nonmagnetic material film 32 of the electromagnetic fluid controller 200 in this embodiment is formed with a uniform thickness. This makes the distance between both the material faces of the armature 31 and the stator 40 uniform and in close proximity during the abutting of the armature 31 and the stator 40 to thereby obtain the advantage of increasing the attraction force acting between the armature 31 and the stator 40.

The nonmagnetic material film 32 of the electromagnetic fluid controller 200 in this embodiment is formed in the entire area of the end face of the armature 31 on the side where the armature 31 and the stator 40 abut. This makes it easier to form the film by plating etc., and reduces the abutting surface pressure, thereby restraining the deterioration of the uniformity or maintenance of the thickness of the nonmagnetic material film 32.

Furthermore, the thickness of the nonmagnetic material film 32 of the electromagnetic fluid controller 200 in this embodiment is set such that an action force of magnetic attraction, which is caused by the residual magnetic flux generated between both the abutting faces upon deenergization of the coil 46, be equal to or lower than a specified value. Also, the thickness of the nonmagnetic material film 32 of the electromagnetic fluid controller 200 in this embodiment is set in the range from 30 to 100 micrometers. Therefore, the preferred thickness of the nonmagnetic material film 32 in this embodiment ranged from 30 to 100 micrometers, the same as the foregoing first embodiment. Thus, it is allowed to preferably prevent the action force of magnetic attraction caused by the residual magnetic flux generated between both the abutting faces of the armature 31 and the stator 40.

In addition, the nonmagnetic material film 32 of the electromagnetic fluid controller 200 is formed of a material containing NiP. By forming the nonmagnetic material film 32 on the end face of the armature 31 facing the stator 40 by plating or the like, the action force of magnetic attraction caused by the residual magnetic flux generated between both the abutting faces of the armature 31 and the stator 40 can be made equal to or lower than a specified value. Additionally, the repeated shock loads by the armature 31 caused neither surface roughening of the nonmagnetic material film 32 nor its peeling off the end face of the armature 31.

Third Embodiment

Figure 7:
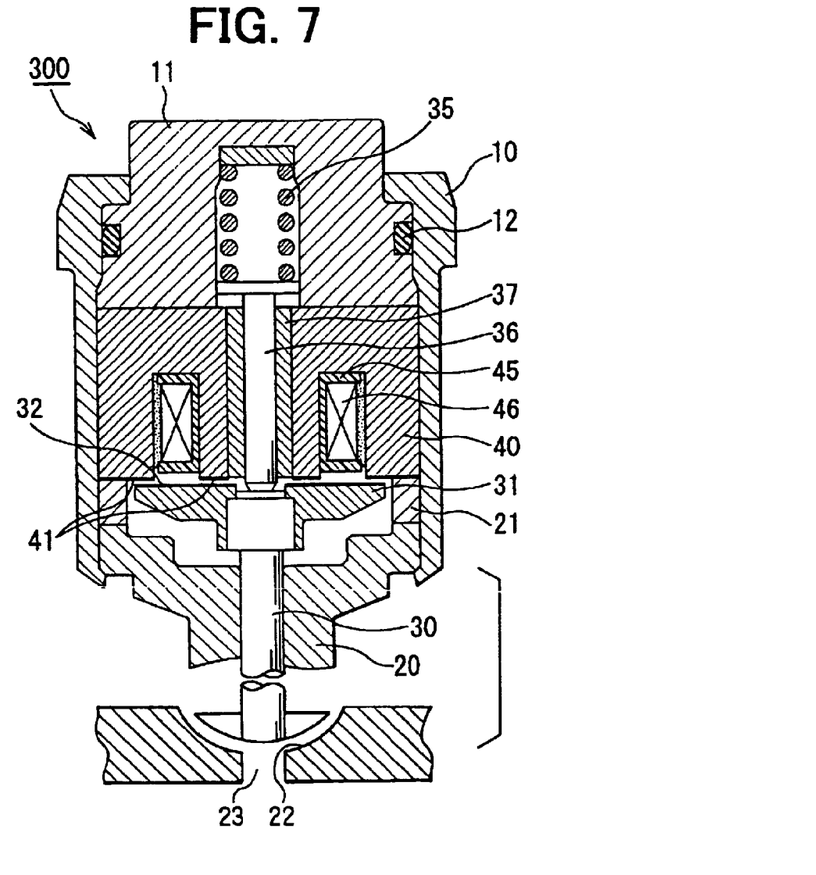
FIG. 7 is a cross-sectional view showing a main part structure of an electronic fluid controller in a third embodiment according to an embodiment of the invention.

FIG. 7 is a cross-sectional view showing the main part structure of an electromagnetic fluid controller in a third embodiment of the invention. In FIG. 7, in the structure of an electromagnetic fluid controller 300, nonmagnetic material films are formed on both abutting faces, which are a nonmagnetic material film 41 on the bottom face of a stator 40 and a nonmagnetic material film 32 on the top face of an armature 31. FIG. 7 also shows a valve seat 22 and a fluid passage 23. Other parts are not changed from the foregoing first and second embodiments, and therefore, the details on those parts will not be described here. With regard to the material of the nonmagnetic material film 32 and the nonmagnetic material film 41, the same descriptions as in the above-mentioned first and second embodiments are applicable.

Figure 8A:
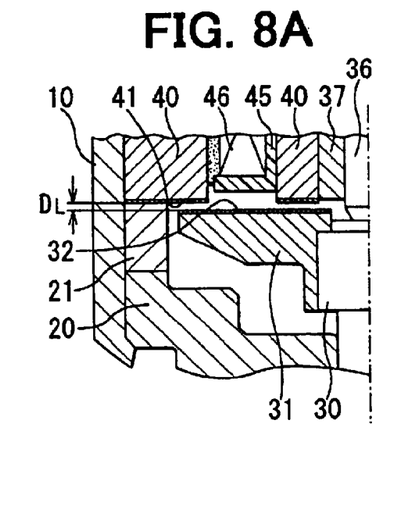
FIG. 8A is an enlarged partial cross-sectional view showing the motion in the electromagnetic fluid controller of FIG. 7.

Next, the motion will be described referring to FIGS. 8A and 8B, which are enlarged partial cross-sectional views showing the motion of the armature 31, shown in FIG. 7, having the fixed valve needle 30. FIG. 8A shows the state during deenergization of the coil 46, and FIG. 8B shows the state during energization of the coil 46.

During deenergization of the coil 46 shown in FIG. 8A, as in FIG. 7, the valve needle 30 is seated in the valve seat 22 of a valve body 20 by the spring force of a spring 35 through a rod 36. Herein, a specified lift amount DL is provided between the nonmagnetic material film 32 formed on the top face of the armature 31 fixed to the valve needle 30 and the nonmagnetic material film 41 formed on the bottom face of the stator 40 facing the nonmagnetic material film 32.

Figure 8B:
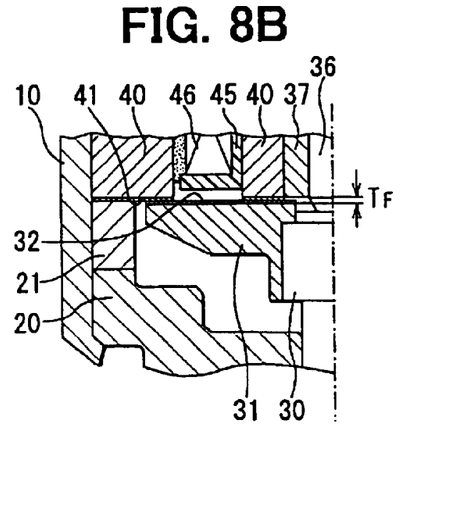
FIG. 8B is an enlarged partial cross-sectional view showing the motion in the electromagnetic fluid controller of FIG. 7.

When the coil 46 shown in FIG. 8B is energized, the stator 40 is magnetized, attracting the armature 31 to the stator 40 against the spring force of the spring 35, so that the nonmagnetic material film 32 formed on the end face of the armature 31 abuts the nonmagnetic material film 41 formed on the end face of the stator 40. The total thickness TF of the nonmagnetic material film 32 and the nonmagnetic material film 41 corresponds to the gap dimension of the conventional air gap GA shown in FIG. 10B. Therefore, the armature 31 and the stator 40, which are both metallic members made of magnetic material, do not directly abut each other due to the nonmagnetic material film 32 and the nonmagnetic material film 41. As a result, the action force of magnetic attraction, which is generated between both the abutting faces upon deenergization of the coil 46, is prevented to thereby decrease the dispersion in delays in the timing of the separation of the armature 31 from the stator 40.

Thus, the electromagnetic fluid controller 300 in this embodiment comprises the valve needle 30, the armature 31, and the stator 40. The valve needle 30 moves reciprocally in the valve body 20 to open and close a fluid passage by being seated in and separated from a valve seat 22 formed on one end of the valve body 20. The armature 31 is fixed to the valve needle 30 on the side opposite to the valve seat 22. The stator 40 accommodates a bobbin 45 around which the coil 46 is wound, the stator being arranged such that the stator 40 faces the armature 31 by the spring force of the spring 35 at a specified distance during deenergization of the coil 46. In this constitution, the nonmagnetic material film 32 and the nonmagnetic material film 41 are formed on both abutting faces, respectively, where the armature 31 and the stator 40 abut each other against the spring force of the spring 35 during energization of the coil 46.

This means that when the coil 46 is energized, the armature 31 is attracted by the stator 40, and the nonmagnetic material film 32 formed on the end face of the armature 31 abuts the nonmagnetic material film 41 formed on the end face of the stator 40. In other words, the armature 31 and the stator 40 abut each other through the nonmagnetic material films 32 and 41. This enables it to restrain the attraction force of magnetic attraction caused by a residual magnetic flux generated upon deenergization of the coil 46 between both the abutting faces of the armature 31 and the stator 40, thereby reducing the effect of the dispersion in delays in the timing of the separation of the armature 31 from the stator 40.

The nonmagnetic material films 32 and 41 of the electromagnetic fluid controller 300 in this embodiment are formed with a uniform thickness. This makes the distance between both the material faces of the armature 31 and the stator 40 uniform and in close proximity during the abutting of the armature 31 and the stator 40 to thereby obtain the advantage of increasing the attraction force acting between the armature 31 and the stator 40.

The nonmagnetic material films 32 and 41 of the electromagnetic fluid controller 300 in this embodiment are formed in the respective entire areas of the end face of the armature 31 and of the end face of the stator 40 on the side where the armature 31 and the stator 40 abut. This makes it easier to form the film by plating etc., and reduces both the abutting surface pressures, thereby permitting it to restrain the deterioration of the uniformity of the thicknesses of the nonmagnetic material films 32 and 41.

Furthermore, the total thickness of the nonmagnetic material films 32 and 41 of the electromagnetic fluid controller 300 in this embodiment is set such that an action force of magnetic attraction, which is caused by the residual magnetic flux generated between both the abutting faces upon deenergization of the coil 46, be equal to or lower than a specified value. Also, the total thickness of the nonmagnetic material films 32 and 41 of the electromagnetic fluid controller 300 in this embodiment is set in the range from 30 to 100 micrometers. Therefore, the preferred total thickness of the nonmagnetic material films 32 and 41 in this embodiment ranged from 30 to 100 micrometers. This is the same as the thickness of the nonmagnetic material film 41 formed on the side of the stator 40 in the foregoing first embodiment or that of the nonmagnetic material film 32 formed on the side of the armature 31 in the foregoing second embodiment. Thus, it is permissible to prevent the action force of magnetic attraction caused by the residual magnetic flux generated between both the abutting faces of the armature 31 and the stator 40.

In addition, the nonmagnetic material films 32 and 41 of the electromagnetic fluid controller 300 are formed of a material containing NiP. By forming the nonmagnetic material films 32 and 41, respectively, on the end face of the armature 31 and on the end-face of the stator 40 by plating or the like, the action force of magnetic attraction caused by the residual magnetic flux generated between both the abutting faces of the armature 31 and the stator 40 could be made equal to or lower than a specified value. Additionally, the repeated shock loads by the armature 31 caused neither surface roughening of the nonmagnetic material films 32 and 41 nor their peeling off the end face of the armature 31 or the end face of the stator 40 respectively.

Details of the preferred embodiments have been described above. Although a nonmagnetic material film is formed in the entire area of the end face of the armature face and/or the end face of the stator face, it is not limited thereto in implementing the invention, and is also allowed to form a nonmagnetic material film only in a needed area of each face at which a stator and an armature abut each other.

As stated in the forgoing embodiments, because of the structure in which the armature and the stator abut each other through a nonmagnetic material film, the nonmagnetic material film has actions and effects corresponding to an air gap, and is expected to prevent a partial contact at both the faces where the armature and the stator abut each other, to thereby avoid a decrease in the attraction force.

In the above-mentioned embodiments, a nonmagnetic material film, formed on each of the abutting faces of the end face of the armature and the end face of the stator, is formed of a material containing NiP by plating or the like. More specifically, the film may be formed by electrical plating or electroless plating of Zn (zinc), Sn (tin), Zn—Sn alloy, Cu (copper) etc., and further, by depositing, or by adhesion of acrylic resin, epoxy resin, urethane resin, phenol resin etc.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electromagnetic fluid controller comprising:
  a valve needle reciprocally situated in a valve body to close and open a fluid passage by being seated in and separated from a valve seat formed at a first end of the valve body;
  an armature fixed to the valve needle at an end of the valve needle opposite to the valve seat;
  a stator accommodating a bobbin around which a coil is wound, the stator being arranged such that the stator faces the armature by a spring force of a spring at a specified distance during deenergization of the coil,
  wherein a nonmagnetic material film is formed on at least one of abutting faces of the armature and the stator where the armature and the stator abut each other against the spring force of the spring during energization of the coil; and
  wherein a total thickness of the nonmagnetic material film is set such that an action force of magnetic attraction is equal to or lower than a specified value, the action force of magnetic attraction being caused by a residual magnetic flux generated between both the abutting faces upon deenergization of the coil.

2. An electromagnetic fluid controller comprising:
  a valve needle reciprocally situated in a valve body to close and open a fluid passage by being seated in and separated from a valve seat formed at a first end of the valve body;
  an armature fixed to the valve needle at an end of the valve needle opposite to the valve seat;
  a stator accommodating a bobbin around which a coil is wound, the stator being arranged such that the stator faces the armature by a spring force of a spring at a specified distance during deenergization of the coil,
  wherein a nonmagnetic material film is formed on at least one of abutting faces of the armature and the stator where the armature and the stator abut each other against the spring force of the spring during energization of the coil; and
  wherein the nonmagnetic material film is formed of a material containing NiP (nickel phosphide).

3. An electromagnetic fluid controller comprising:
  a valve needle reciprocally situated in a valve body to close and open a fluid passage by being seated in and separated from a valve seat formed at a first end of the valve body;
  an armature fixed to the valve needle at an end of the valve needle opposite to the valve seat;
  a stator accommodating a bobbin around which a coil is wound, the stator being arranged such that the stator faces the armature by a spring force of a spring at a specified distance during deenergization of the coil,
  wherein a nonmagnetic material film is formed on at least one of abutting faces of the armature and the stator where the armature and the stator abut each other against the spring force of the spring during energization of the coil; and
  wherein a total thickness of the nonmagnetic material film is in a range from 30 to 100 micrometers; and
  wherein the nonmagnetic material film is formed of a material containing NiP (nickel phosphide).

* * * * *